(12) United States Patent
Corghi (10) Patent No.: US 11,465,632 B2
(45) Date of Patent: Oct. 11, 2022

(54) APPARATUS FOR CALIBRATING AN ADAS SENSOR OF AN ADVANCED DRIVER ASSISTANCE SYSTEM OF A VEHICLE

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 51 days.

(21) Appl. No.: 16/749,002

(22) Filed: Jan. 22, 2020

(65) Prior Publication Data
US 2020/0239009 A1 Jul. 30, 2020

(30) Foreign Application Priority Data

Jan. 25, 2019 (IT) .......................... 102019000001171

(51) Int. Cl.
*B60W 40/12* (2012.01)
*B60W 40/04* (2006.01)
*B60W 50/00* (2006.01)

(52) U.S. Cl.
CPC ............ *B60W 40/12* (2013.01); *B60W 40/04* (2013.01); *B60W 2050/0083* (2013.01)

(58) Field of Classification Search
CPC ................. B60W 40/12; B60W 40/04; B60W 2050/0083; G06Q 10/20
See application file for complete search history.

(56) References Cited

U.S. PATENT DOCUMENTS

| | | | |
|---|---|---|---|
| 5,513,439 A * | 5/1996 | Brauer | G01B 7/315 702/33 |
| 7,424,387 B1 | 9/2008 | Gill et al. | |
| 2003/0023395 A1 | 1/2003 | O'Mahony et al. | |
| 2011/0077900 A1 | 3/2011 | Corghi | |
| 2018/0046989 A1 * | 2/2018 | Colarelli, III | G06V 20/62 |
| 2018/0188022 A1 | 7/2018 | Leikert | |
| 2019/0018408 A1 * | 1/2019 | Gulati | G05D 1/0055 |
| 2019/0249985 A1 | 8/2019 | Stieff et al. | |
| 2020/0141724 A1 * | 5/2020 | Lawrence | G01B 11/272 |

FOREIGN PATENT DOCUMENTS

| | | |
|---|---|---|
| EP | 2150772 A1 | 2/2010 |
| EP | 2302318 A1 | 3/2011 |
| WO | 2008/130385 A1 | 10/2008 |
| WO | 2015/092594 A2 | 6/2015 |
| WO | 2017/016541 A1 | 2/2017 |
| WO | 2018/067354 A1 | 4/2018 |
| WO | 2018/153722 A1 | 8/2018 |

* cited by examiner

*Primary Examiner* — Peter D Nolan
*Assistant Examiner* — Tanya C Sienko
(74) *Attorney, Agent, or Firm* — Pearne & Gordon LLP (57) ABSTRACT

An apparatus (1) for calibrating an ADAS sensor of an advanced driver assistance system of a vehicle (9) positioned in a service area (8), includes: a support structure (3); a vehicle calibration assistance structure (4), mounted on the support structure (3) and including a calibration device (41, 42) configured to facilitate aligning or calibrating the ADAS sensor of the vehicle (9); a positioning system; a computer (102), having access to a database (101) and configured to: receive one or more information items as input; query the database (101) to retrieve a reference parameter (111) and a geometric parameter (112) as a function of the input information; process the reference parameter (111) and the geometric parameter (112) to generate derived data (114) relating to a reference position of the vehicle calibration assistance structure (4).

20 Claims, 4 Drawing Sheets

APPARATUS FOR CALIBRATING AN ADAS SENSOR OF AN ADVANCED DRIVER ASSISTANCE SYSTEM OF A VEHICLE

This invention relates to an apparatus and a method for calibrating an ADAS sensor of an advanced driver assistance system sensor of a vehicle.

In the field of driver assistance systems, target units used in procedures for aligning and calibrating the sensors of advanced driver assistance systems may be mounted on trolley-like structures.

For example, patent document WO2018/067354A1 provides a structure used to support an optical target for calibrating a vehicle camera and a metallic target for calibrating a radar sensor of the vehicle.

Other structures used for calibrating vehicle sensors are described in patent documents US2018/0188022A1, WO2017/016541 and WO2018/153722A1.

These structures must be positioned in front of the vehicle at a predetermined distance and oriented in a predetermined manner relative to a reference point of the vehicle. The reference point of the vehicle may be, for example, the vehicle's logo or an axle of the vehicle. Every vehicle manufacturer specifies the optimum position of the target unit; that is to say, the geometrical distances at which the structure that supports the target units must be positioned relative to a reference point on the vehicle which is predetermined by the manufacturer; the reference points are often different, depending on the manufacturer or the model of the vehicle. The operator responsible for calibration therefore has to move the structure to the optimum position specified by the manufacturer of the vehicle.

For operators in this field; continually changing the position of the structure and of the reference point on the vehicle to adjust to the manufacturer's specifications is tedious and time-consuming.

Moreover, the operator needs to have a plurality of different positioning systems to position the structure using as a reference a point chosen by the manufacturer from a plurality of different points on the vehicle. Therefore, the operator must have a front positioning system for vehicles whose reference point is the logo, a further side positioning system for vehicles whose reference point is on the wheel, and so on. Then, the operator has to select, among a plurality of different positioning systems, the adequate positioning system for each vehicle which undergoes ADAS calibration, depending on the manufacturer's specifications for this vehicle. This invention has for an aim to provide an apparatus and a method for calibrating an advanced driver assistance system sensor of a vehicle to overcome at least one of the above mentioned drawbacks of the prior art.

This aim is fully achieved by the apparatus and method for calibrating an ADAS sensor of an advanced driver assistance system of a vehicle as characterized in the appended claims.

According to one aspect, this disclosure relates to an apparatus for calibrating an ADAS sensor (at least one). By ADAS sensor is meant a sensor forming part of an advanced driver assistance system of a vehicle.

The apparatus comprises a base unit. Preferably, the base unit includes a plurality of wheels rotating about respective axes of rotation. Preferably, at least one wheel of the plurality of wheels can swivel about a respective swivel axis. Still more preferably, all the wheels of the plurality of wheels can swivel about respective swivel axes. The swivel axis of each wheel is preferably at right angles to the respective axis of rotation. The swivel axis is oriented along a vertical direction, parallel to the weight force.

In an embodiment, the wheels are spherical; in that case, the wheels can rotate (and swivel) about an axis of rotation parallel to the floor and can also swivel (and rotate) about a plurality of swivel axes, where at least one swivel axis of the plurality of swivel axes is at right angles to the axis of rotation.

The vehicle is positioned in a service area. By "service area" is meant a zone which houses the vehicle during service procedures such as, for example, calibrating the ADAS sensors, aligning the headlights, or balancing the wheels.

The base unit is thus movable on wheels. In particular, the wheels are useful to move the apparatus from a rest position, where it is away from the service area, to a working position, where it is close to, and directed at, the service area. In effect, when the apparatus is at the rest position, the service area may be used for other wheel service operations such as wheel balancing, for example.

In other embodiments, the base unit is mounted on rails.

The apparatus comprises a support structure. The support structure is connected to (or integral with) the base unit.

The apparatus comprises a vehicle calibration assistance structure. The vehicle calibration assistance structure is mounted on the support structure. The vehicle calibration assistance structure includes a calibration device. The calibration device is configured to facilitate alignment or calibration of the (at least one) ADAS sensor of the vehicle.

In an embodiment, the support structure can be driven by a person (that is, an operator responsible for calibration) in such a way that the vehicle sensor can "detect" (or "strike" or "view"—these terms being used synonymously in the context of this disclosure) the calibration device. It should be noted that use of the verb "to detect" or "to view" is not intended as limiting the disclosure to optical sensors; in effect, the vehicle sensor might also be a radar sensor or other types of sensors, as described in this disclosure.

In an embodiment, the apparatus includes a positioning system. The positioning system is configured to aid with the relative positioning between the vehicle and the vehicle calibration assistance structure.

The apparatus comprises a computer. The computer has access to a database.

The database might itself be part of the apparatus.

The database might also be part of an external server (which might itself be an object of protection of this disclosure). In effect, according to one aspect it, this disclosure relates to a server. The server includes a database. The server includes a processor.

In an embodiment, the database includes a plurality of reference parameters. Each reference parameter of the plurality of reference parameters relates to a predetermined position of a reference calibration device, configured to calibrate a predetermined ADAS sensor, relative to a reference first element (the first element being referred to a reference vehicle). Preferably, for each type of ADAS sensor and/or for each type of vehicle, the database includes a respective reference parameter.

The reference vehicle is associated with (that is, corresponds to) the vehicle positioned in the service area. In an embodiment, the reference vehicle is a vehicle of the same type as the vehicle positioned in the service area.

The predetermined ADAS sensor is associated with (that is, corresponds to) the ADAS sensor to be calibrated. In an embodiment, the ADAS sensor is a sensor of the same type as the ADAS sensor to be calibrated. The ADAS sensor to be calibrated (and the predetermined ADAS sensor) can be selected from one of the following types: distance sensor (radar or laser, for example), parking sensor (camera, for example), lane-change sensor (camera, for example), dusk sensor, automatic road sign recognition sensor (camera, for example), blind spot sensor (camera, for example).

In an embodiment, each reference parameter relates to specifications, supplied by vehicle manufacturers, for aligning or calibrating a respective predetermined ADAS sensor of a respective reference vehicle. In an embodiment, the specifications include a reference distance of the calibration assistance structure (or of the support structure) from the first reference element. The first reference element may be, for example, the front logo, the front end (that is, the front end of the bonnet), the front camera, the front axle (that is, a reference point on the front wheel) or the rear axle (that is, a reference point on the rear wheel) of the reference vehicle.

In an embodiment, the specifications include a reference orientation of the calibration assistance structure (or of the support structure) relative to the first reference element. In an embodiment, the specifications include a reference height of the calibration assistance structure (or of the support structure) relative to the first reference element.

In an embodiment, the specifications include a reference height of the calibration assistance structure (or of the support structure) relative to a flat supporting surface which the calibration assistance structure and the vehicle are positioned on.

In an embodiment, the database includes a plurality of geometric parameters. Each geometric parameter of the plurality of geometric parameters relates to a geometric relation existing between the first element and a second element (of the reference vehicle). For each first element and/or for each second element, the database preferably includes a respective geometric parameter.

The processor (of the server) is programmed to select from the database a reference parameter of the plurality of reference parameters, in response to a query. The processor is programmed to select from the database a geometric parameter of the plurality of geometric parameters, in response to the query.

In an embodiment, the processor (of the server) is configured to receive the one or more information items as input; to query the database to retrieve the reference parameter and the geometric parameter as a function of one or more input information items; to process the reference parameter and the geometric parameter in order to generate derived data.

In an embodiment, the computer of the apparatus is connected to the processor of the server.

In an embodiment, the computer of the apparatus coincides with the processor of the server.

According to one aspect of it, this disclosure relates to a system for calibrating an ADAS sensor, comprising the apparatus according to one or more aspects of this disclosure and the server according to one or more aspects of this disclosure.

The computer is configured to receive one or more information items as input. The one or more input information items regard at least one of the following parameters: a type of vehicle positioned in the service area; a type of ADAS sensor (to be calibrated); a second reference element of the vehicle positioned in the service area.

The second reference element may be, for example, the front logo, the front camera, the front axle (that is, a reference point on the front wheel) or the rear axle (that is, a reference point on the rear wheel) of the vehicle. Thus, in an embodiment, the second reference element and the first reference element are different elements selectable from the same list.

In an embodiment, the one or more input information items include a first input information item regarding the second reference element of the vehicle positioned in the service area.

In an embodiment, the one or more input information items include a second input information item regarding a type of ADAS sensor to be calibrated.

In an embodiment, the one or more input information items include a third input information item regarding a type of vehicle positioned in the service area.

Thus, the database includes a plurality of records. Preferably, each record is associated with a predetermined type of vehicle and a predetermined type of ADAS sensor to be calibrated. Each record includes the positioning specifications for positioning a vehicle of the predetermined type for calibrating an ADAS sensor of the predetermined type; these specifications, laid down by the manufacturer, constitute the reference parameter and are referred to a first reference element. For each type of vehicle, the database also includes one or more geometric parameters, relating to geometric relations existing in the vehicle between the first reference element and other reference elements (different from the first) which may be used by the operator as references. The operator then selects the reference element they wish to use as a reference and which will constitute the second reference element.

Provided below by way of an example is an extract of the database according to a possible embodiment; this extract includes an indication of the fields of the table and an example of the contents of the fields of one record (one row of the table).

| Vehicle make | Vehicle model | ADAS sensor to be calibrated | Second reference element | Reference parameter | Geometric parameter |
|---|---|---|---|---|---|
| X | Y | Radar distance sensor | Vehicle (front) camera | Target panel must be positioned at distance of 2.7 meters from logo and aligned therewith | Logo is 1 metre away from (front) camera and aligned therewith |

In this example, the reference parameter then includes a distance of 2.7 metres of the calibration device from the vehicle's front logo (which in this case is the first reference element); the geometric parameter includes a distance of 1 metre between the front logo and the vehicle's front camera (which in this case is the second reference element); the derived data, referred to the vehicle's front camera, will give a distance of 3.7 metres of the assistance structure from the vehicle's front camera and a right-angled orientation of the assistance structure relative to an axis of symmetry of the vehicle.

The computer is configured to query the database. In an embodiment, the computer queries the database through the processor of the server. The computer is programmed to retrieve from the database a reference parameter (of the plurality of reference parameters). The processor is configured to retrieve from the database a geometric parameter (of the plurality of geometric parameters).

The computer is configured to process the reference parameter and the geometric parameter in order to generate derived data. The derived data relate to a reference position of the vehicle calibration assistance structure (or of the calibration device, or of the support structure) relative to the second reference element of the vehicle positioned in the service area.

Therefore, the solution object of present disclosure allows the operator to position the vehicle calibration assistance structure using as a reference element to perform the positioning a reference element which is different from the one prescribed by the vehicle manufacturer. So, the solution object of present disclosure gives the operator higher maneuvering freedom in ADAS calibration.

In an embodiment, the derived data include a reference distance of the calibration assistance structure (or of the support structure) from the second reference element of the vehicle. In an embodiment, the derived data include a reference orientation of the calibration assistance structure (or of the support structure) relative to the second reference element of the vehicle. In an embodiment, the derived data include a height of the calibration assistance structure (or of the support structure) relative to the second reference element of the vehicle.

That way, the operator can use a reference element different from the one specified by the manufacturer, thus minimizing the possibility of error converting the measurements (from the first reference element to the second).

Thus, starting from a predetermined position relative to a first reference element, the computer derives a reference position relative to a second reference element, different from the first. This allows using a positioning reference element different from the one that is predetermined from the data contained in the database. It is thus possible to always use the same reference element or to use the reference element most suitable for the equipment available, regardless of the fact that the database refers to a plurality of different reference elements. This facilitates operations for positioning the calibration apparatus and saves the operator time in carrying out these operations because they can use reference elements that are more convenient for them, regardless of the reference elements of the database.

In an embodiment, the support structure includes (in addition or alternatively to a motion actuator) a grippable portion which can be held by the person (or operator) to drive the support structure manually. Preferably, the grippable portion includes one or more handles.

In an embodiment, the apparatus comprises a remote control, operatively connected to the motion actuator to send drive commands to the motion actuator. In this embodiment; therefore, the support structure can be driven by the person using the remote control (in addition or alternatively to the possibility of driving manually with the grippable portion or automatically with the processing unit to control the motion actuator).

In other imaginable embodiments; the support structure can be driven either by a person (with the grippable portion and/or with the remote control or automatically by a remote control; depending on circumstances, the person can select a manual mode (in which the structure is moved manually using the grippable portion); a semi-automatic mode (in which the structure includes a motion actuator or self-propelled unit driven by the remote control) or an automatic mode (in which the structure includes a motion actuator or self-propelled unit driven by the processing unit). In an embodiment, the interface includes a touch screen and also works as a remote control).

In an embodiment, the vehicle calibration assistance structure is moved along the support structure in the vertical direction by means of an actuator (for example, an electric motor). The actuator is controlled (or controllable) by the person through a drive unit (for example, a switch panel or a lever). In an embodiment, the drive unit is associated with the support structure, preferably in proximity to the grippable portion.

In an embodiment, the vehicle calibration assistance structure can be moved manually along the support structure in the vertical direction. In an embodiment; the support structure defines a plurality of heights at which the calibration assistance structure can be positioned.

In one embodiment, the apparatus comprises an interface. The interface is connected to the computer. The interface preferably includes a processor.

In an embodiment, the interface is configured to show a user a request for data relating to a plurality of predetermined options for the second reference element. In an embodiment, the plurality of predetermined options for the second reference element includes at least one of the following options: front logo of the vehicle; front end of the vehicle; camera of the vehicle; front axle of the vehicle; rear axle, of the vehicle.

In an embodiment, the interface is configured to receive from the user a preference relating to the second reference element. In an embodiment, the preference is defined by an option chosen from the plurality of predetermined options.

In an embodiment, the interface is configured to transmit to the computer an input information item, of the one or more input information items, regarding the second reference element, as a function of the preference. Thus, in an embodiment, the user can advantageously select the preferred second reference element from among the plurality of available options.

In an embodiment, the apparatus includes a sensor (for example, an optical sensor) configured to detect a second reference element of the vehicle. The sensor is connected to the computer.

In an embodiment, the interface is connected to the sensor to receive data from it relating to the second reference element. Thus, the interface is configured to ask the user for confirmation relating to the second reference element detected; in response to the confirmation (affirmative) from the user, the interface is configured to transmit to the computer an input information item, of the one or more input information items, regarding the second reference element, as a function of that confirmation.

In an embodiment, the interface is configured to show a user the request for data relating to a plurality of predetermined options for the second reference element in response to the user's failure to confirm.

In an embodiment, the computer is connected to the sensor which detects the second reference element and is configured to receive the first input information item from the sensor (without confirmation from the user).

In an embodiment, the vehicle calibration assistance structure includes a plurality of calibration devices, configured to facilitate alignment or calibration of a respective plurality of ALAS sensors.

In an embodiment, the interface is configured to show the user a (further) request for data relating to a plurality of predetermined options for the ADAS sensor to be calibrated among the plurality of ADAS sensors.

In an embodiment, the interface is configured to receive from the user a (further) preference relating to the ADAS sensor to be calibrated among the plurality of ADAS sensors.

In an embodiment, the interface is configured to transmit to the computer the second (input) information item, regarding the type of ADAS sensor to be calibrated, as a function of the (further) preference.

Thus, in an embodiment, the user can easily select the ADAS sensor to be calibrated from among the plurality of available options.

In another embodiment, it is not necessary to select the ADAS sensor to be calibrated. For example, in one embodiment, the vehicle positioned in the service area might include only one sensor: in such a case, the computer can be configured to select, as a function of the third input information item regarding the type of vehicle, the calibration device needed to calibrate the vehicle's only sensor and to retrieve from the database the reference parameter relating to the predetermined position of the reference calibration device, configured to calibrate the predetermined ADAS sensor associated with (or corresponding to) the only ADAS sensor present on the vehicle.

Also, in an embodiment, the vehicle calibration assistance structure might include one calibration device only and thus be configured to facilitate alignment or calibration of the vehicle's single ADAS sensor.

Also, in an embodiment, the predetermined position (defined by the reference parameter) might be independent of the type of ADAS sensor to be calibrated.

In an embodiment, the second input information Item might also be preset during the initial step of configuring the computer. In an embodiment, the operator can set the type of ADAS sensor to be calibrated so that the computer no longer asks for it to be selected; at any time later, the operator can change the type of ADAS sensor set.

In an embodiment, the interface is configured to make derived data available to the user.

In an embodiment, the type of vehicle includes a make and/or model of the vehicle. In an embodiment, the computer is connectable to the vehicle's electronic control unit (for example, wired or through a dongle connected to the vehicle's OBD port) to retrieve the third input information item from the vehicle's electronic control unit. In an embodiment, the computer is connectable to the vehicle's electronic control unit (for example, wired or through a dongle) to retrieve an identification code (VIN) of the vehicle. The vehicle's identification code includes the third input information item, of the one or more input information items relating to the type of vehicle.

In an embodiment, the computer comprises (or has access to) a customer database; the customer database includes a plurality of customer records, where each record is associated with a specific vehicle and includes a vehicle registration number and an information item relating to the ADAS sensor present on that vehicle.

The customer database may be integrated in the database already mentioned in this disclosure or it may be a distinct database (in the latter case; the two databases are preferably correlated with each other).

In an embodiment, the records of the customer database can be entered in the database manually by the operator.

In an embodiment, the apparatus includes a registration number reader (including, for example, a stills camera and an optical character recognition—OCR—device), In an embodiment, the apparatus includes a bar code and/or QR-code reader (including, for example, a stills camera and code recognition software). In an embodiment, the interface is configured to allow the operator to enter the registration number manually.

In an embodiment, the computer can be configured to store in the customer database, for every new vehicle positioned in the service area, a record containing the respective registration number (entered manually by the operator or read by the reader) and the ADAS sensor or sensors which the operator chooses to calibrate (by selecting the second input information item).

In an embodiment, when the vehicle is positioned in the service area, the computer is configured to receive the vehicle's registration number (from the registration number reader or entered manually) and to query the customer database to check whether that registration number is associated with a record already entered therein.

If the registration number is associated with an existing record in the customer database, the computer is configured to derive the second input information item as a function of the information item relating to the ADAS sensors present on the vehicle, this information item being recorded in the customer database. More specifically, the computer is configured to retrieve the reference parameter relating to the predetermined position for calibrating the ADAS sensor actually present on the vehicle. If the vehicle has more than one ADAS sensor, the computer may be configured to select the reference parameter necessary to calibrate one ADAS sensor at a time.

If the registration number is not associated with an existing record in the customer database, the computer is configured to prompt the operator to select the second input information item and, preferably, to save a respective new record in the customer database.

It should be noted that what is described above with regard to the vehicle registration number can be applied, with the necessary changes made, to other numbers or identification codes of the vehicle such as, for example, a bar code or a OR code (applied on the vehicle or on the vehicle ownership certificate).

In an embodiment, the interface includes an input unit to receive from the user the preference and/or the confirmation and/or the further preference.

In an embodiment, the interface includes an output unit, configured to make the derived data available.

In an embodiment, the output unit includes a screen. In an embodiment, the screen is associated (integral) with the support structure. The screen displays the derived data (for example, in numeric form and/or with arrows).

In an embodiment, the output unit includes a loudspeaker.

In an embodiment, the output unit comprises a printer configured to create a report document (for example, in the form of a file or an adhesive label containing a bar code or a OR code). The report document is useful to provide evidence of the positions where calibration procedures have been carried out, so that they are available for future calibration procedures or for determining liability, if necessary, in the case of an accident.

In an embodiment, the apparatus comprises at least one height gauge, configured to measure the height of a wheel arch of the vehicle relative to the flat supporting surface the vehicle positioned on in the service area.

Preferably, the surface which supports the vehicle is the same as the flat surface which also supports the base unit (this flat supporting surface, in an embodiment, is detected by a height distance meter associated with the calibration assistance structure).

The height gauge is configured to send to the computer a signal representing that height.

By "wheel arch" is meant the portion of the vehicle's chassis (or bumper) placed above the wheel, relative to a vertical direction passing through the centre of the wheel.

In an embodiment, the apparatus comprises at least one height gauge, configured to measure the height of a wheel arch. The height gauge is movable and can be positioned at a wheel arch to be measured. The height gauge is used to measure the height of the vehicle's two front wheel arches and/or rear wheel arches relative to the flat supporting surface. The height gauge is configured to send to the computer a signal representing the height measured.

The computer is configured to communicate the wheel arch heights to the electronic control unit of the vehicle. In effect, in an embodiment, the electronic control unit requires input of the effective height of the wheel arches in order to be able to calibrate the ALAS sensor with a high degree of precision.

In an embodiment, the interface is configured to allow the user to enter the wheel arch height or heights manually.

In an embodiment, the height gauge includes a height distance meter applicable to the wheel arch, in order to measure the effective height of the wheel arch from the flat supporting surface and to transmit a signal to the computer as a function of the effective height measured.

In an embodiment, the height distance meter is an optical distance sensor. In an embodiment, the height distance meter is an acoustic distance sensor (for example, an ultrasonic wave sensor). In an embodiment, the height distance meter is a laser distance meter.

In an embodiment, the height distance meter is wirelessly connected to the computer (for example, by Bluetooth or Wi-Fi) to transmit a signal representing the height measured.

In an embodiment; the apparatus comprises (or has access to) a wheel balance database; the wheel balance database includes information to adjust the vehicle's wheel balance (including, for example, for each type of vehicle; reference ranges to indicate acceptable values for specific wheel balance parameters such as, for example, toe, camber or others. The wheel balance database may be integrated in the database already mentioned in this disclosure or it may be a distinct database (in the latter case, the two databases are preferably correlated with each other). In an embodiment, the wheel balance database includes a field which, for each vehicle, represents the presence of an ADAS device.

Thus, for each vehicle or type of vehicle, the apparatus can have access both to information for adjusting wheel balance and to information described in the context of this disclosure to adjust the ADAS devices. According to another aspect; the (wheel balance) database may include correlations, if any, relating to the influence of wheel balance on the positioning of the ADAS devices. For example, if adjusting a wheel balance value determines (or is likely to lead to) the misalignment of an ADAS device (sensor); the processing system can provide a warning signal (through the interface); indicating that as a result of adjusting the wheel balance, it may be necessary or advisable to calibrate one or more of the ADAS devices (the processing system being equipped with a processing unit programmed to generate such a warning). For example; the processing unit is programmed to prompt the operator to check the calibration of the ADAS sensors in response to a situation where the operations carried out on the wheel balance have caused a change in the thrust axis of the vehicle.

In an embodiment, the positioning system includes a positioning device which is spaced from the support structure. In an embodiment, the positioning device is movable on wheels or on rails extending parallel to the travelling direction of the vehicle located in the service area. In an embodiment, the positioning device includes an optical device of the positioning device, oriented in a second lateral direction to view graphical features of the vehicle (for example, of the vehicle's wheels). In an embodiment, the positioning device includes a matching camera of the positioning device, oriented in a backward direction, opposite to the forward direction, to view the positioning target element. The positioning device provides a relative reference system, relative to the vehicle, for positioning the support structure. The processing unit is connected to the optical device and to the matching camera of the positioning device, to process the image data captured by the optical device and by the matching camera of the positioning device, in order to derive the information regarding the actual position of the support structure relative to the vehicle.

In an embodiment, the positioning system is configured to capture values of a position parameter in real time. The position parameter represents a position of the support structure and/or of the vehicle calibration assistance structure, relative to the vehicle.

In an embodiment, the positioning system includes at least one distance meter configured to measure the distance of the support structure from the vehicle (or from a target panel associated with the vehicle).

The distance meter is configured to measure (in contactless mode) the distance of an object relative to a reference point of the distance meter itself (e.g., the midpoint of the rear side).

In an embodiment, the distance meter is an optical distance sensor (for example, a camera). In an embodiment, the distance meter is an acoustic distance sensor (for example, an ultrasonic wave sensor).

In an embodiment, the distance meter is a laser distance meter which projects a laser beam on an object whose distance is to be measured. In an embodiment, the distance meter also comprises an accelerometer (for example, a triaxial accelerometer), which allows calculating the distance in a horizontal direction (at right angles to the vertical direction) and/or in a vertical direction when the measuring direction is inclined.

In an embodiment, the distance meter is mounted on the support structure, preferably removably. In an embodiment, the positioning system includes a positioning target element associated with one of the vehicle's wheels (preferably one of the front wheels). The distance meter is configured to view the positioning target element (or a surface thereof or graphical features represented thereon).

In another embodiment, the distance meter is mounted, preferably removably, on the positioning target element associated with the wheels. The distance meter is thus configured to view graphical features of the support structure.

In an embodiment, the positioning system includes a pair of distance meters and a pair of positioning target elements associated with respective wheels (preferably the front wheels) of the vehicle; the distance meters of the pair are each configured to measure the distance of the respective positioning target element of the pair.

In an embodiment, the at least one distance meter (or pair of distance meters) is associated with the wheel (or wheels) and the corresponding positioning target element (or the corresponding positioning target elements) is associated with the support structure.

In an embodiment, the positioning system includes a first pair of heads, mounted on the support structure. In an embodiment, the positioning system includes a second pair of heads associated with respective wheels (preferably the rear wheels) of the vehicle.

The heads of the first pair of heads each include an emitter/transmitter (in one embodiment, LED; in another embodiment, laser), directed at a respective head of the second pair of heads.

The heads of the first pair of heads each include a first and a second end; the first and second ends are each provided with a receiver and/or an emitter, configured to come into communication with a corresponding emitter or receiver of another head. For these emitters/receivers, various different technological solutions may be used: for example, CCD and/or laser and/or LED. More specifically, in an embodiment, LED emitters and CCD receivers are used.

In an embodiment, each of the heads may include a first receiver, directed at the respective head of the second pair of heads (to receive a signal therefrom). Each head of the first pair of heads may include a first emitter/transmitter, operatively directed at the other head of the first pair of heads.

In an embodiment, each head of the first pair of heads may include a second receiver, operatively directed at the other head of the first pair of heads. Each head of the first pair of heads may include a second emitter/transmitter, operatively directed at the other head of the first pair of heads.

What is described above with regard to the first pair of heads also applies to the second pair of heads.

The first and the second pair of heads—when they are connected to the structure and to the vehicle in such a way that the heads are in communication with each other, those mounted on the structure are in communication with each other and each head mounted on the vehicle is in communication with a corresponding head mounted on the structure—are configured to measure the orientation of the support structure relative to the thrust axis of the vehicle.

The at least one distance meter may be used in combination with the heads.

In an embodiment, the calibration device includes a target panel having a surface bearing a combination of predetermined graphical features. The predetermined graphical features of the target panel are supplied by the vehicle manufacturer and may therefore differ from one vehicle to another. In this embodiment, the calibration device is configured to calibrate an ADAS camera of the vehicle.

In an embodiment, the graphical features are pre-printed on the target panel. In an embodiment, the target panel is defined by a screen, configured to display the combination of predetermined graphical features. In an embodiment, the calibration device includes a projector, configured to project the predetermined graphical features on the target panel.

In an embodiment, the calibration device includes a reflector having a metallic surface or a surface capable of reflecting electromagnetic waves at the frequencies at which radar sensors of ADAS systems work. In this embodiment, the calibration device is configured to facilitate alignment or calibration of an ADAS radar sensor of the vehicle.

In an embodiment, the calibration device includes a target panel configured to calibrate a LIDAR sensor or a camera of the advanced driver assistance system of the vehicle. The target panel for calibrating a LIDAR sensor is reflective in one embodiment and retroreflective in another embodiment.

In an embodiment, the calibration device includes a device configured to calibrate or align an infrared ADAS sensor.

In an embodiment, the apparatus includes a plurality of calibration devices of the kinds described above, designed to be removably coupled to the support structure (in one embodiment, one in place of another). In another embodiment, the apparatus includes a plurality of calibration devices of the kinds described above, fixed to respective portions of the support structure.

In an embodiment, the positioning system includes a laser blade. The laser blade is preferably associated with the support structure and directed at the service area. In an embodiment, the laser blade is oriented perpendicularly to the target panel and/or to the reflector. In an embodiment, the laser blade is configured to facilitate alignment of the support structure relative to the axis of symmetry of the vehicle.

In an embodiment, the laser blade can swivel about at least one axis which is integral with the support structure to illuminate a point or a line of the vehicle, in order to help the person orient or position the support structure. More specifically, the laser blade is useful for positioning the support structure relative to an axis of symmetry (in effect, the laser blade detects the front logo and/or the front end).

In an embodiment, where the structure has to be positioned with reference to the axis of symmetry of the vehicle, the laser blade is useful for performing this positioning operation.

In an embodiment, where the structure has to be positioned with reference to the thrust axis of the vehicle, the laser blade is useful for pre-positioning the structure relative to an axis of symmetry of the vehicle; other instruments—such as the heads described herein—can then be used for positioning relative to the thrust axis.

This disclosure also relates to a method for calibrating a sensor (at least one) of an advanced driver assistance system (ADAS) of a vehicle. The vehicle is positioned in a service area.

The method comprises a step of preparing a base unit.

The method comprises a step of preparing a support structure, integral with the base unit. The vehicle calibration assistance structure includes a calibration device (at least one), configured to facilitate alignment or calibration of the ADAS sensor of the vehicle.

The method comprises a step of positioning the support structure in proximity to the service area in such a way that the sensor of the vehicle can "view" (or "strike" or "detect") the calibration device.

The method comprises a step of sending a calibration command to an electronic control unit of the vehicle.

The method comprises a step of detecting (or viewing) the calibration device through the vehicle sensor to be calibrated.

The method comprises a step of processing data received from the electronic control unit of the vehicle.

The method comprises a step of receiving one or more input information items in a computer of an apparatus for calibrating a sensor (or in a processor of a server). The one or more input information items regard at least one of the following parameters: a type of vehicle positioned in the service area; a type of ADAS sensor; a second reference element of the vehicle positioned in the service area.

The method comprises a step of querying a database. In an embodiment, querying comprises retrieving a reference parameter as a function of the input information. In an embodiment, querying comprises retrieving a geometric parameter a function of the input information. Querying may be carried out by the computer of the apparatus or the processor of the server or jointly by the computer of the apparatus and the processor of the server.

The method comprises a step of processing the reference parameter and the geometric parameter in order to generate derived data. The derived data relate to a reference position of the vehicle calibration assistance structure relative to the second reference element of the vehicle positioned in the service area.

Processing may be carried out by the computer of the apparatus or the processor of the server or jointly by the computer of the apparatus and the processor of the server.

In an embodiment, the method comprises a step of providing the user with the derived data through an interface.

In an embodiment, the method comprises a step of submitting to the user through the interface a request for data relating to a plurality of predetermined options for the second reference element.

In an embodiment, the method comprises a step of the interface receiving from the user a preference relating to the second reference element.

In an embodiment, the method comprises a step of the interface transmitting to the computer the first input information item, regarding the second reference element, as a function of the preference.

In an embodiment, the method comprises a step of capturing a second reference element through a sensor.

In an embodiment, the method comprises a step of the interface receiving data from the sensor relating to the second reference element. In an embodiment, the method comprises a step of the interface prompting the user for confirmation relating to the second reference element captured.

In an embodiment, the method comprises a step of transmitting to the computer the first input information item, regarding the second reference element, in response to a confirmation (affirmative) from the user.

In an embodiment, the interface is configured to submit to the user the request for data relating to a plurality of predetermined options for the second reference element in response to the user's failure to confirm.

In an embodiment, the method comprises a step of submitting to the user through the interface a request for data relating to a plurality of predetermined options for the ADAS sensor to be calibrated.

In an embodiment, the method comprises a step of receiving from the user a (further) preference relating to the ADAS sensor to be calibrated.

In an embodiment, the method comprises a step of transmitting to the computer a third input information item of the one or more input information items regarding the type of ADAS sensor to be calibrated, as a function of the further preference.

In an embodiment, the step of positioning comprises moving the support structure to a reference position indicated by the derived data.

In an embodiment, moving the support structure is done manually by the user by pushing or pulling the structure.

In an embodiment, moving the support structure is done by a self-propelled unit associated with the support structure and comprising a processor configured to receive the derived data and to move the support structure as a function of the derived data.

These and other features will become more apparent from the following detailed description of a preferred, non-limiting embodiment, illustrated by way of example in the accompanying drawings, in which.

With reference to the accompanying drawings, the numeral 1 denotes an apparatus for calibrating an ADAS sensor of a vehicle 9.

Figure 1:
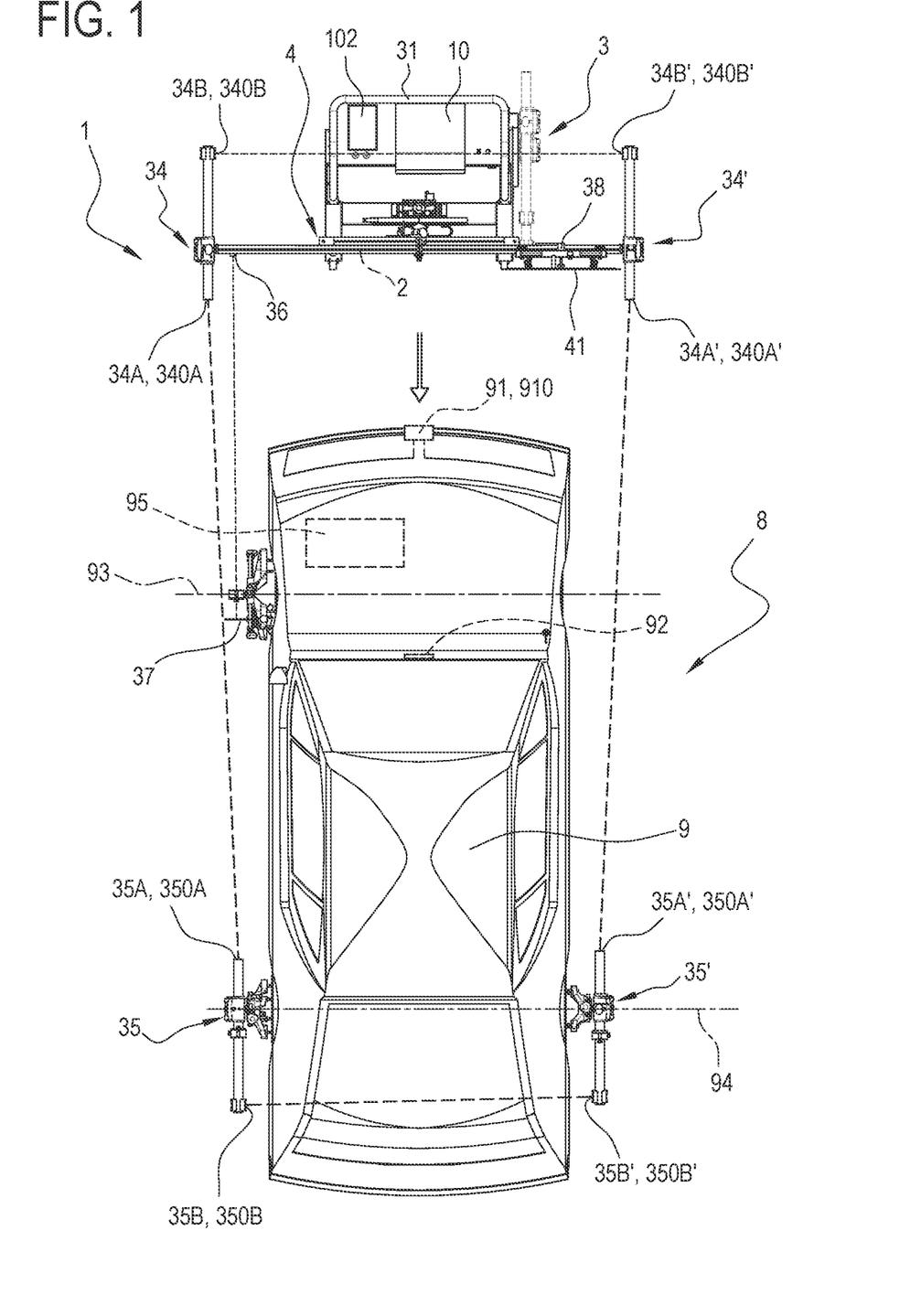
FIG. 1 illustrates, in a top plan view, an apparatus according to this disclosure for calibrating an ADAS sensor of a vehicle positioned in a service area.

The vehicle 9 is positioned in a service area 8.

The apparatus 1 comprises a base unit 2. The base unit 2 includes a plurality of wheels 20. The wheels 20 of the plurality rotate or are rotatable about respective axes of rotation. The wheels 20 also swivel about respective swivel axes, oriented perpendicularly to the respective axes of rotation. The swivel axis of each wheel is at right angles (or substantially at right angles) to the respective axis of rotation. The expression at right angles or substantially at right angles is used to mean an inclination between 80° and 110°, preferably between 85° and 100° and, still more preferably, 90°. Preferably, the swivel axis is oriented along a vertical direction, parallel to the weight force (or along a substantially vertical direction).

In an embodiment, the base unit comprises a stabilizer foot (at least one) which is movable between a raised position and a lowered position. The stabilizer foot may be moved by hand or through actuators controlled by the person or by the processing unit. When the structure is being moved, the foot is kept in the raised position; when the structure reaches a predetermined distance from a reference point, the foot is lowered so as to hold the base unit in place.

The stabilizer foot, at the lowered position, may serve as a pivot for rotating the structure.

In an embodiment, the stabilizer foot includes a locking device configured to lock the foot at the lowered position (or at the raised position).

The apparatus 1 comprises a support structure 3, mounted on the base unit 2.

The apparatus 1 comprises a vehicle calibration assistance structure 4. The vehicle calibration assistance structure 4 is mounted on the support structure 3.

In an embodiment, the vehicle calibration assistance structure 4 includes a target panel 42. The target panel 42 bears predetermined graphical features to perform (or assist in the performance of) calibration of a camera of the vehicle 9.

In an embodiment, the vehicle calibration assistance structure 4 includes a reflector 41. The reflector 41 is capable of reflecting electromagnetic waves for performing (or assisting in the performance of) calibration of a radar sensor of the vehicle 9. In an embodiment, the reflector 41 can be moved (on a carriage) in a horizontal direction, at right angles to the vertical direction V.

In an embodiment, the vehicle calibration assistance structure 4 includes a carriage, slidably coupled to the support structure 3. More specifically, the carriage is slidable in a vertical direction V to adjust the vehicle calibration assistance structure 4 in height relative to the support structure 3.

In an embodiment, the vehicle calibration assistance structure 4 is tiltable relative to the support structure 3 (about a vertical tilting axis), to vary the orientation of the vehicle calibration assistance structure 4 relative to the support structure 3.

In an embodiment, the support structure 3 is tiltable relative to the base unit 2 (about a vertical tilting axis), to vary the orientation of the support structure 3 relative to the base unit 2.

In an embodiment, the apparatus 1 comprises an optical projection system which includes a laser emitter. The laser emitter is configured to project a laser blade or laser beam on the vehicle 9 which is positioned in the service area 8.

The support structure 3 can be driven manually by a person. In effect, the person pushes or pulls the support structure 3, which moves on the wheels 20.

In an embodiment, the support structure 3 includes a grippable portion 31, which is configured to allow (or make it easier for) the person to grip it with at least one hand. In an embodiment, the support structure 3 includes a first and a second grippable portion 31 configured to allow (or make it easier for) the person to grip it with a first and a second hand, respectively. The apparatus 1 comprises a positioning system.

In an embodiment, the positioning system includes a first pair of heads 34, 34' associated with the support structure 3 (preferably at opposite ends of a horizontal bar 30 of the support structure 3, oriented perpendicularly to the vertical direction) and a second pair of heads 35, 35' associated with brackets which are operatively connectable (or connected) to respective rear wheels of the vehicle 9. In this embodiment, the positioning system uses as its reference point a rear axle 94 of the vehicle 9.

In one embodiment, the heads 34, 34' and 35, 35' are laser heads and, in other embodiments, are LED/CCD heads.

Figure 2A:
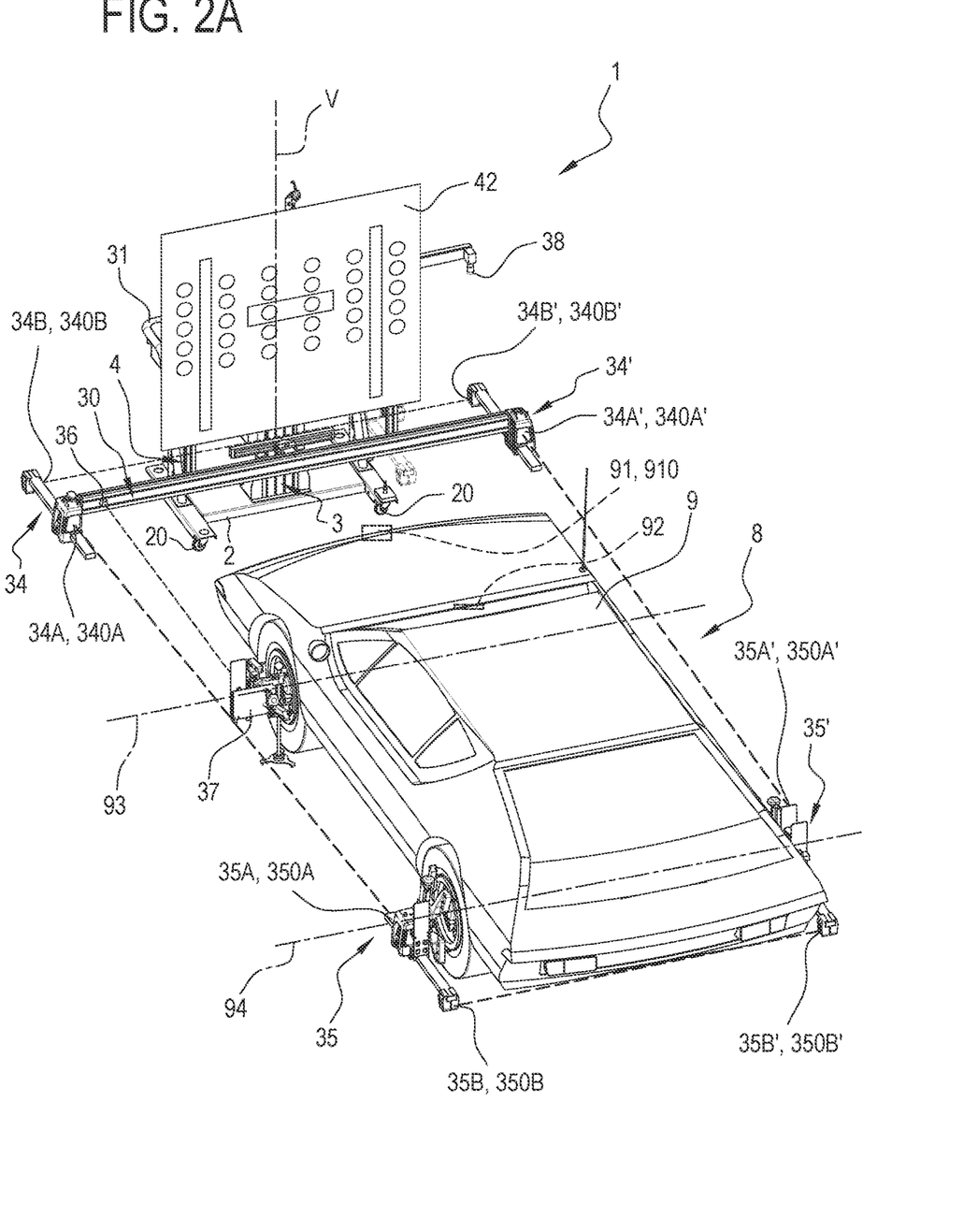
FIGS. 2A and 2B illustrate the apparatus of FIG. 1 in respective operating configurations.
Figure 2B:
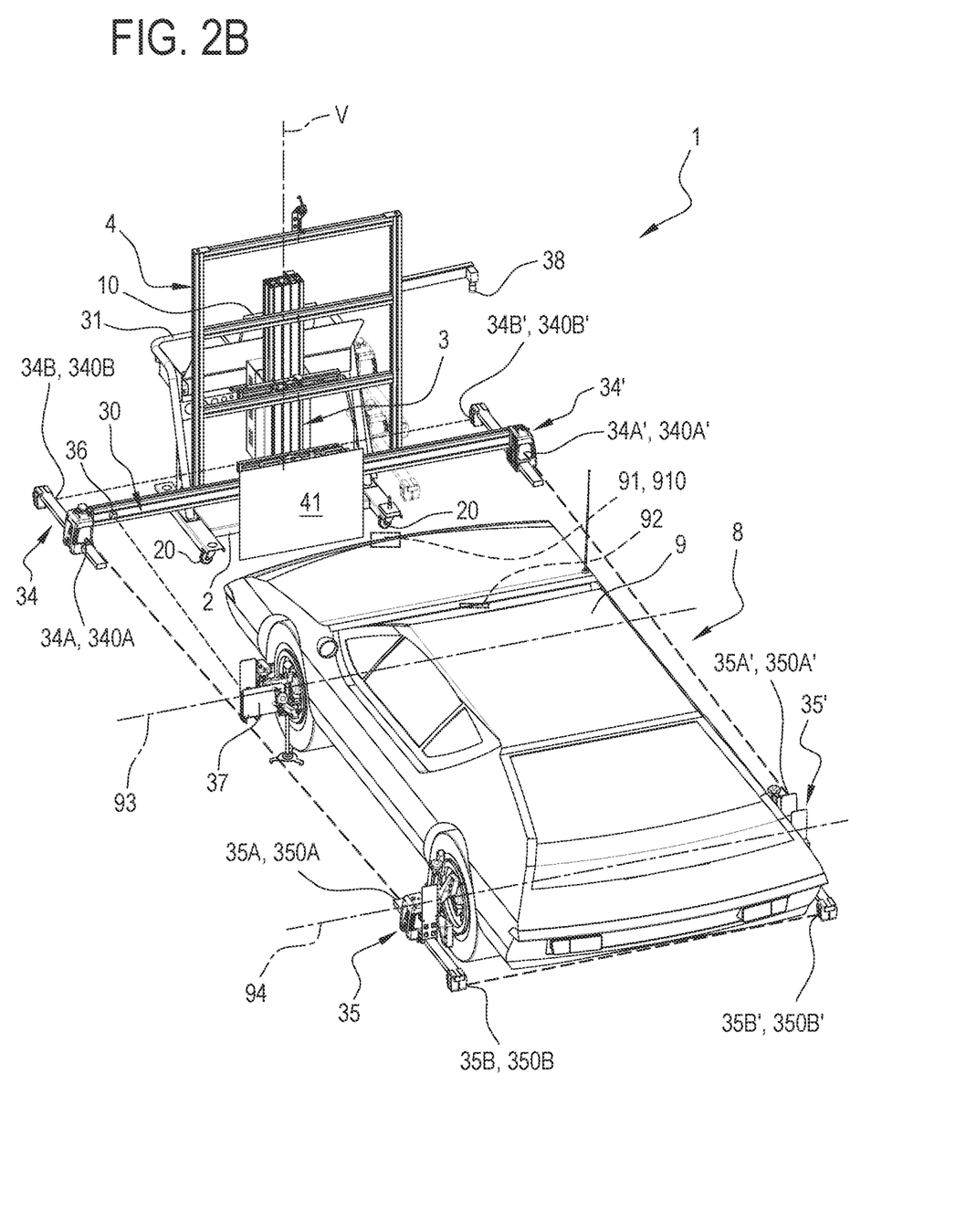

The heads 34, 34" associated with the support structure 3 each include a first emitter 34A, 34A', and a corresponding first receiver 340A, 340A', configured to detect the corresponding laser head 35, 35' associated with the wheel of the vehicle 9 (in order to detect the orientation of the support structure 3 relative to the thrust axis of the vehicle 9). The heads 34, 34' associated with the support structure 3 each include a second emitter 34B, 34a, and a corresponding second receiver 340B, 340B' directed at the other head 34, 34' of the first pair of heads, in order to view it.

Each head of the second pair of heads 35, 35', associated with the wheels, includes a first emitter 35A, 35A' and a corresponding first receiver 350A, 350A, directed towards the support structure 3 to view a corresponding head 34, 34' of the first pair of heads (or the emitter 34A, 34A' thereof). Each head of the second pair of heads 35, 35', associated with the wheels, includes a second emitter 35B, 35B' and a corresponding second receiver 350B, 350B', directed towards the other head 35, 35' of the second pair of heads in order to view it.

The first emitter 34A, 34A', the first receiver 340A, 340A', the second emitter 34B, 34B' and the second receiver 340B, 3408' of the first pair of heads 34, 34' are preferably mounted on arms which are directed in directions which make an angle of at least 90° with each other. The first emitter 35A, 35A', the first receiver 350A, 350A', the second emitter 35B, 35B' and the second receiver 350B, 350B' of the second pair of heads 35, 35' are preferably mounted on arms which are directed in directions which make an angle of 90° with each other.

In an embodiment, the positioning system includes a pair of distance meters 36, associated with the support structure 3 (preferably on the horizontal bar 30, at a position further in than the heads 34, 34') and a pair of positioning target elements 37, coupled to the front wheels of the vehicle 9. In this embodiment, the positioning system uses as its reference point a front axle 93 of the vehicle 9. The distance meters 36 are configured to view the respective positioning target elements 37 to measure the distance of the support structure 3 from the vehicle 9.

In an embodiment, the positioning system includes one distance meter 36 and one positioning target element 37 coupled to a front wheel of the vehicle 9.

The heads 34, 34', 35, 35' and the distance meters 36 may be provided in combination with each other.

In an embodiment, the distance meters 36 are used to view the target elements 37 and thus to measure both the distance and the orientation of the support structure 3 relative to the vehicle 9.

In an embodiment, the heads 34, 34', 35, 35' and only one distance meter 36 are used; in effect, the heads 34, 34', 35, 35' measure the angular orientation of the support structure 3 and the distance meter 36 measures the distance of the support structure 3 relative to the vehicle 9 (more specifically, relative to the second reference parameter of the vehicle 9). In an embodiment, the heads 34, 34', 35, 35' are used to measure the angular orientation, and a camera (mounted on the support structure 3) is used to measure the distance of the support structure 3 from the vehicle 9. The camera may use, as reference point, a (front) logo 91 or a front camera 92 or a front end 910 of the vehicle 9.

In an embodiment, the positioning system includes a height distance meter 38 mounted on the vehicle calibration assistance structure 4 and directed towards the floor the base unit 2 rests on in order to measure the height of the vehicle calibration assistance structure 4 relative to the floor (hence relative to the support structure 3, whose height from the floor is fixed). The height distance meter 38 is particularly useful in the case where the vehicle calibration assistance structure 4 is slidable along the support structure 3 in the vertical direction (on the carriage).

In another embodiment, the height distance meter 38 is not provided; in this embodiment, the height of the calibration assistance structure 4 is known (or is measured manually and entered as input by the person).

In an embodiment not illustrated in the drawings, the positioning system includes a positioning target element of the support structure, connected to the support structure 3. In an embodiment, the positioning system includes a positioning device which is spaced from the support structure. In an embodiment, the positioning device is movable on a respective trolley. In an embodiment, the positioning device is movable on respective rails. The positioning device includes an optical device, oriented in a lateral direction to see graphical features of the vehicle (preferably on one of the vehicle's wheels). The optical device of the positioning device preferably includes a first camera and a second camera, in a stereo configuration. The positioning device is positioned at a front axle of the vehicle (if it is to view graphical features of the front wheel) or at a rear axle of the vehicle (if it is to view graphical features of the rear wheel). The positioning device includes a matching camera, oriented towards the positioning target element of the support structure (that is, oriented in a backward direction, opposite to the forward direction).

Figure 3:
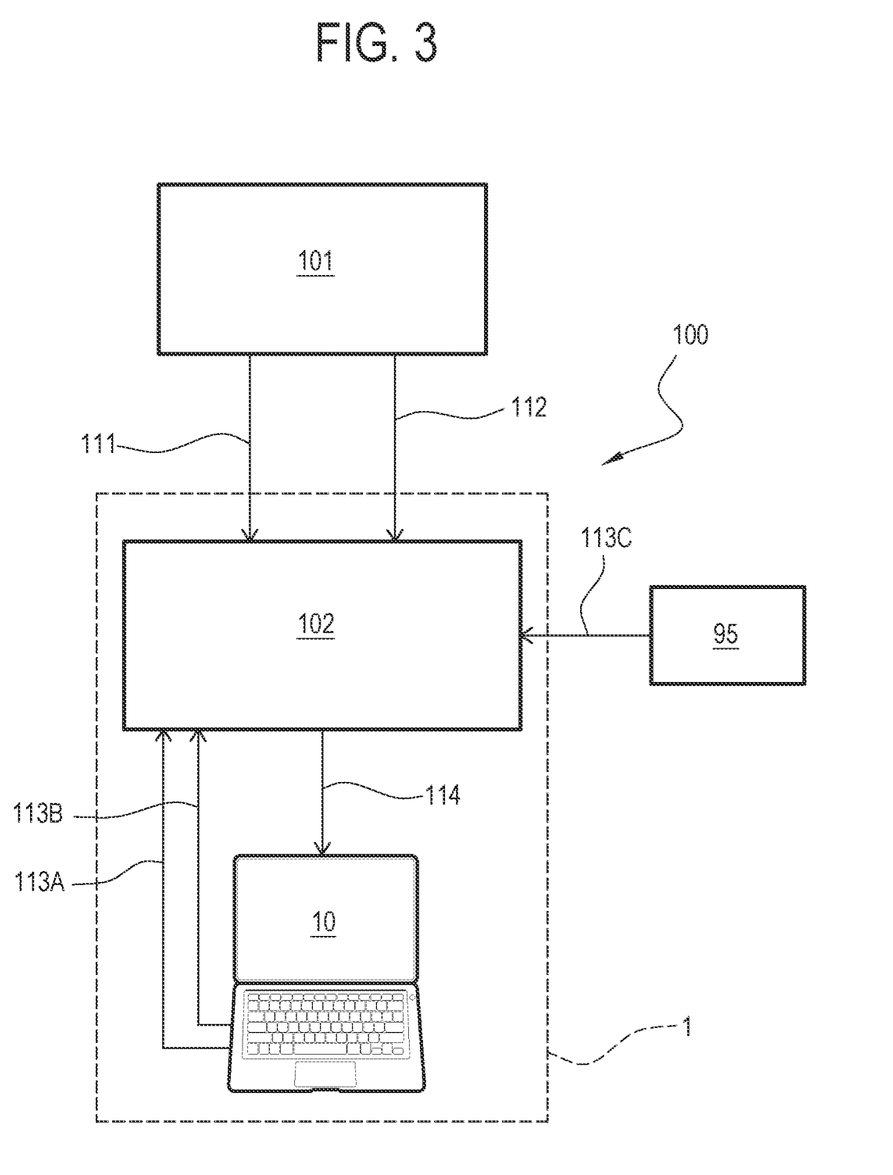
FIG. 3 schematically illustrates a system according to this disclosure for calibrating an ADAS sensor of a vehicle positioned in a service area.

The apparatus 1 comprises a computer 102. The computer 102 has access to a database 101. The database 101 may form part of the apparatus 1 or of a remote server connected to the apparatus 1.

The apparatus 1 comprises an interface 10, connected to the computer 102.

In an embodiment, the computer 102 is configured to receive a third input information item 1130 relating to a type of vehicle 9 positioned in the service area 8. The third input information item 1130 includes the make and/or model of the vehicle 9.

In an embodiment, the computer 102 is connectable to an electronic control unit 95 of the vehicle 9 to receive from it a vehicle identification code, which includes the third input information item 1130.

In an embodiment, the interface 10 is configured to receive the third input information item 1130 from a user.

In an embodiment, the computer 102 is configured to receive a second input information item 113B relating to a type of ADAS sensor to be calibrated. In an embodiment, the interface 10 is configured to show a user a request for data relating to a plurality of predetermined options for the ADAS sensor to be calibrated, to receive from the user a preference relating to the ADAS sensor to be calibrated and to transmit to the computer 102 the second input information item 113B as a function of that preference.

In an embodiment, the computer 102 is configured to receive a first input information item 113A relating to a second reference element of the vehicle 9 positioned in the service area 8. The second reference element of the reference vehicle corresponds to the element of the vehicle 9 to be used as a reference for positioning the support structure 3.

For example, the second reference element may be the front logo of the reference vehicle (corresponding to the front logo 91 of the vehicle 9), the front end of the reference vehicle (corresponding to the front end 910 of the vehicle 9), the front camera of the reference vehicle (corresponding to the front camera 92 of the vehicle 9), the front axle of the reference vehicle (corresponding to the camera 93 of the vehicle 9 or to a reference point on the front wheel) or the rear axle of the reference vehicle (corresponding to the rear axle 94 of the vehicle 9 or to a reference point on the rear wheel).

In an embodiment, the interface 10 is configured to show a user a request for data relating to a plurality of predetermined options for the second reference element, to receive from the user a preference relating to the second reference element and to transmit to the computer 102 the first input information item 113A as a function of that preference.

The computer 102 is configured to query the database 101 to retrieve a reference parameter 111 and a geometric parameter 112 as a function of the first input information item 113A, second input information item 113E and third input information item 113C.

The reference parameter 111 represents a predetermined position of a reference calibration device, configured to calibrate a predetermined ADAS sensor (of the same type as the ADAS sensor to be calibrated), relative to a first element of a reference vehicle (of the same type as the vehicle 9 positioned in the service area 8). The reference parameter 111 is defined by the specifications of the manufacturers. The reference parameter 111 may include a distance and/or an orientation and/or a predetermined height of the reference calibration device relative to a first reference element of the reference vehicle (the reference vehicle being of the same type as the vehicle 9 positioned in the service area 8). The first reference element may be, for example, the front logo, the front end, the front camera, the front axle (that is, a reference point on the front wheel) or the rear axle (that is, a reference point on the rear wheel) of the reference vehicle.

The geometric parameter 112 represents a geometric relation existing between the first reference element of the reference vehicle (which the reference parameter 111 refers to) and a second reference element of the reference vehicle (which may be preset or chosen by the user on a case-by-case basis). The second reference element of the reference vehicle is uniquely correlated with a corresponding second reference element of the vehicle 9 positioned in the service area 8.

For example, if the first reference element is the front axle of the reference vehicle and the option chosen for the second reference element is the front logo 91 of the vehicle 9, the geometric parameter 112 includes a geometric relation between the front axle of the reference vehicle and the front logo of the reference vehicle. The geometric relation is preferably defined in a space coordinate system.

The computer 102 is configured to process the reference parameter 111 and the geometric parameter 112 in order to generate derived data 114. The derived data 114 relate to a reference position of the vehicle calibration assistance structure 4 relative to the second reference element of the vehicle 9 positioned in the service area 8.

In an embodiment, the database 101 includes a reference height of the wheel arches relative to the flat supporting surface.

Thus, in the example where the first reference element (which the reference parameter 111 refers to) is the front axle of the reference vehicle and the option chosen for the second reference element is the front logo 91 of the vehicle 9, the derived data 114 represent a reference position of the vehicle calibration assistance structure 4 relative to the front logo 91 of the vehicle 9.

Preferably, the interface 10 is configured to make the derived data 114 available to the user.

This disclosure also relates to a server comprising the database 101. The database 101 comprises a plurality of reference parameters 111 (or more generally speaking, at least one reference parameter 111). More specifically, for each type of vehicle and for each ADAS sensor to be calibrated, the database 101 comprises a respective reference parameter 111, representing a predetermined position of a respective calibration device configured to calibrate that sensor, relative to a reference vehicle associated with that type of vehicle.

The database 101 comprises a plurality of geometric parameters 112. More specifically, for each option for the second reference element selectable by the user and for each ADAS sensor of each type of vehicle, the database 101 comprises a geometric parameter 112 representing a geometric relation existing between the first reference element 111, which the data of the database 101 for that ADAS sensor of that type of vehicle refer to, and the second reference element.

In an embodiment, the server comprises a processor programmed to select from the database 101 a reference parameter 111 of the plurality of reference parameters 111 and a geometric parameter 112 of the plurality of geometric parameters 112, in response to a query.

This disclosure also relates to a system 100 for calibrating an ADAS sensor. The system 100 comprises the apparatus 1 and the server.

In an embodiment, the computer 102 has access to the database 101 through the processor of the server. In an embodiment, the processor of the server coincides with the computer 102 of the apparatus 1.

This disclosure also relates to a method for calibrating a sensor of an advanced driver assistance system (ADAS) of a vehicle 9. The vehicle 9 is positioned in a service area 8.

The method comprises a step of preparing a base unit 2.

The method comprises a step of preparing a support structure 3; integral with the base unit 2. The method comprises a step of preparing a vehicle calibration assistance structure 4 mounted on the support structure 3. The vehicle calibration assistance structure 4 includes a calibration device, configured to facilitate alignment or calibration of the ADAS sensor of the vehicle 9.

The method comprises a step of positioning the support structure 3 in proximity to the service area 8 in such a way that the sensor of the vehicle 9 can detect the calibration device.

The method comprises the steps of: sending a calibration command to an electronic control unit of the vehicle 9; detecting the calibration device through the sensor of the vehicle 9 to be calibrated: processing data received from the electronic control unit of the vehicle 9.

The method comprises a step of a computer 102 receiving one or more input information items 113A, 113B, 113C regarding at least one of the following parameters: a type of vehicle 9 positioned in the service area 8: a type of ADAS sensor; a second reference element of the vehicle 9 positioned in the service area 8.

More specifically, in an embodiment, the one or more input information items 113A, 113B, 1130 include a first input information item 113A regarding the second reference element of the vehicle 9.

In an embodiment, the one or more input information items include a second input information item 113E regarding the type of ADAS sensor to be calibrated.

In an embodiment, the one or more input information items include a third input information item 1130 regarding a type of vehicle 9 positioned in the service area 8.

The method comprises a step of querying the database 101 to retrieve a reference parameter 111 and a geometric parameter 112 as a function of the input information.

The method comprises a step of processing the reference parameter 111 and the geometric parameter 112 in order to generate derived data 114.

With regard to the reference parameter 111, the geometric parameter 112 and the derived data 114, what is described herein regarding the apparatus and the system also applies to the method,

The invention claimed is:

1. An apparatus for calibrating an ADAS sensor of an advanced driver assistance system of a vehicle positioned in a service area, comprising:
   a base unit;
   a support structure integral with the base unit;
   a vehicle calibration assistance structure, mounted on the support structure and including a calibration device configured to facilitate aligning or calibrating the ADAS sensor of the vehicle;
   a positioning system configured to aid with a relative positioning between the vehicle calibration assistance structure and the vehicle;
   wherein the positioning system comprises a computer, having access to a database and configured to:
      receive one or more input information items, including a first input information item relating to a second reference element of the vehicle positioned in the service area;
      query the database to retrieve a reference parameter and a geometric parameter as a function of the one or more input information items, wherein
      the reference parameter relates to a predetermined position of a calibration device to calibrate a predetermined ADAS sensor; the predetermined ADAS sensor corresponding to the ADAS sensor of the vehicle positioned in the service area, the predetermined position being referred to a first reference element, and wherein
      the first input information item relates to a second reference element of the vehicle positioned in the service area, and wherein
      the geometric parameter relates to a geometric relation, for a given type of vehicle, between the first reference element and the second reference element, different from the first reference element;
      process the reference parameter and the geometric parameter to generate derived data relating to a reference position of the vehicle calibration assistance structure relative to the second reference element of the vehicle positioned in the service area,
      wherein the reference parameter relates to specifications, supplied by vehicle manufacturers, for aligning or calibrating the respective predetermined ADAS sensor of the vehicle,
      wherein the specifications include a reference distance of the calibration assistance structure or of the support structure from the first reference element.

2. The apparatus according to claim 1, comprising an interface, connected to the computer and configured to:
   show a user a request for data relating to a plurality of predetermined options for the second reference element;
   receive from the user a preference relating to the second reference element;
   transmit to the computer the first input information item as a function of the preference.

3. The apparatus according to claim 2, wherein the plurality of predetermined options for the second reference element includes at least the following options:
   front logo of the vehicle;
   front end of the vehicle;
   front camera of the vehicle;
   front axle of the vehicle;
   rear axle of the vehicle.

4. The apparatus according to claim 3, wherein the first reference element is an element of a reference vehicle of the same type as the vehicle positioned in the service area.

5. The apparatus according to claim 4, wherein the first reference element is selected from the following list:
   front logo of the reference vehicle;
   front end of the reference vehicle;
   front camera of the reference vehicle;
   front axle of the reference vehicle;
   rear axle of the reference vehicle.

6. The apparatus according to claim 2, wherein the vehicle calibration assistance structure includes a plurality of calibration devices, configured to facilitate alignment or calibration of a respective plurality of ADAS sensors,
   wherein, the one or more input information items include a second input information item regarding the type of ADAS sensor to be calibrated, and wherein the interface is configured to:
      show the user a further request for data relating to a plurality of predetermined options for an ADAS sensor to be calibrated of the plurality of ADAS sensors:
      receive from the user a further preference relating to the ADAS sensor to be calibrated among the plurality of ADAS sensors;
      transmit to the computer the second input information item as a function of the further preference.

7. The apparatus according to claim 2, wherein the interface is configured to make the derived data available to the user.

8. The apparatus according to claim 2, wherein the one or more input information items include a third input information item regarding a type of vehicle positioned in the service area, wherein the type of vehicle includes the make and/or model of the vehicle.

9. The apparatus according to claim 8, wherein the computer is connectable to an electronic control unit of the vehicle to retrieve from the electronic control unit of the vehicle a vehicle identification code, including the first input information item.

10. The apparatus according to claim 1, wherein the derived data include a reference distance between the vehicle calibration assistance structure and the second reference element of the vehicle positioned in the service area.

11. The apparatus according to claim 1, wherein the derived data include a reference orientation of the vehicle calibration assistance structure relative to the second reference element of the vehicle positioned in the service area.

12. The apparatus according to claim 1, wherein the derived data include a reference height of the vehicle calibration assistance structure relative to the second reference element of the vehicle positioned in the service area.

13. The apparatus according to claim 1, comprising at least one height gauge, configured to measure the height of a wheel arch of the vehicle relative to a flat surface supporting the vehicle positioned in the service area and to send to the computer a signal representing that height.

14. A server comprising:
a database, including:
a plurality of reference parameters, wherein each reference parameter of the plurality of reference parameters relates to a predetermined position of a calibration device, for calibrating a predetermined ADAS sensor, the predetermined position being referred to a first reference element;
a plurality of geometric parameters, wherein each geometric parameter of the plurality of geometric parameters relates to a geometric relation between the first reference element of the reference vehicle and a second reference element of the reference vehicle;
a processor programmed to select from the database a reference parameter of the plurality of reference parameters and a geometric parameter of the plurality of geometric parameters, in response to a query,
wherein each reference parameter of said plurality of geometric parameters relates to specifications, supplied by vehicle manufacturers, for aligning or calibrating the respective predetermined ADAS sensor of the vehicle,
wherein the specifications include a reference distance of the calibration assistance structure or of the support structure from the first reference element.

15. The server according to claim 14, wherein the processor is configured to:
receive one or more input information items regarding at least one of the following parameters: a type of vehicle positioned in a service area; a type of ADAS sensor to be calibrated; a second reference element of a vehicle positioned in the service area;
query the database to retrieve a selected reference parameter of the plurality of reference parameters and a selected geometric parameter of the plurality of geometric parameters; as a function of the one or more input information items;
process the selected reference parameter and the selected geometric parameter to generate derived data relating to a reference position of a vehicle calibration assistance structure relative to the second reference element of the vehicle positioned in the service area.

16. A system for calibrating an ADAS sensor of an advanced driver assistance system of a vehicle positioned in a service area, comprising:
an apparatus according to claim 1; and
a server, the server comprising:
a database, including:
a plurality of reference parameters, wherein each reference parameter of the plurality of reference parameters relates to a predetermined position of a calibration device, for calibrating a predetermined ADAS sensor, the predetermined position being referred to a first reference element;
a plurality of geometric parameters, wherein each geometric parameter of the plurality of geometric parameters relates to a geometric relation between the first reference element of the reference vehicle and a second reference element of the reference vehicle;
a processor programmed to select from the database a reference parameter of the plurality of reference parameters and a geometric parameter of the plurality of geometric parameters, in response to a query,
wherein each reference parameter of said plurality of geometric parameters relates to specifications, supplied by vehicle manufacturers, for aligning or calibrating the respective predetermined ADAS sensor of the vehicle,
wherein the specifications include a reference distance of the calibration assistance structure or of the support structure from the first reference element.

17. A method for calibrating a sensor of an advanced driver assistance system of a vehicle, wherein the vehicle is positioned in a service area, the method comprising the following steps:
preparing a base unit;
preparing a support structure, which is integral with the base unit, and a vehicle calibration assistance structure, mounted on the support structure, the vehicle calibration assistance structure including a calibration device configured to facilitate aligning or calibrating the ADAS sensor of the vehicle;
positioning the support structure in proximity to the service area in such a way that the sensor of the vehicle can detect the calibration device;
sending a calibration command to an electronic control unit of the vehicle;
detecting the calibration device through the sensor of the vehicle to be calibrated;
processing data received from the electronic control unit of the vehicle;
wherein the method further comprises the following steps:
receiving at a computer one or more input information items, including a first input information item relating to a second reference element of the vehicle, the vehicle being positioned in the service area;
querying a database to retrieve a reference parameter and a geometric parameter as a function of the input information items, wherein the reference parameter relates to a predetermined position of a reference calibration device, to calibrate a predetermined ADAS sensor, the predetermined ADAS sensor corresponding to the ADAS sensor of the vehicle positioned in the service area, the predetermined position being referred to a first reference element, and wherein the geometric parameter relates to a geometric relation, for a given type of vehicle, between the first reference element and a second reference element, different from the first reference element;

processing the reference parameter and the geometric parameter to generate derived data relating to a reference position of the vehicle calibration assistance structure relative to the second reference element of the vehicle positioned in the service area,
  wherein the reference parameter relates to specifications, supplied by vehicle manufacturers, for aligning or calibrating the respective predetermined ADAS sensor of the vehicle,
  wherein the specifications include a reference distance of the calibration assistance structure or of the support structure from the first reference element.

18. The method according to claim 17, wherein said positioning comprises moving the support structure to a reference position indicated by the derived data.

19. The method according to claim 17, comprising a step of providing a user with the derived data through an interface.

20. The method according to claim 17, comprising the following steps:
  submitting to a user, through an interface, a request for data relating to a plurality of predetermined options for the second reference element;
  receiving from the user, at the interface, a preference relating to the second reference element;
  transmitting from the interface to the computer the first input information item, regarding the second reference element, as a function of the preference.

* * * * *